J. P. RAYMOND.
Paper-Bag Machines.
No. 145,125.
5 Sheets--Sheet 3.
Patented Dec. 2, 1873.
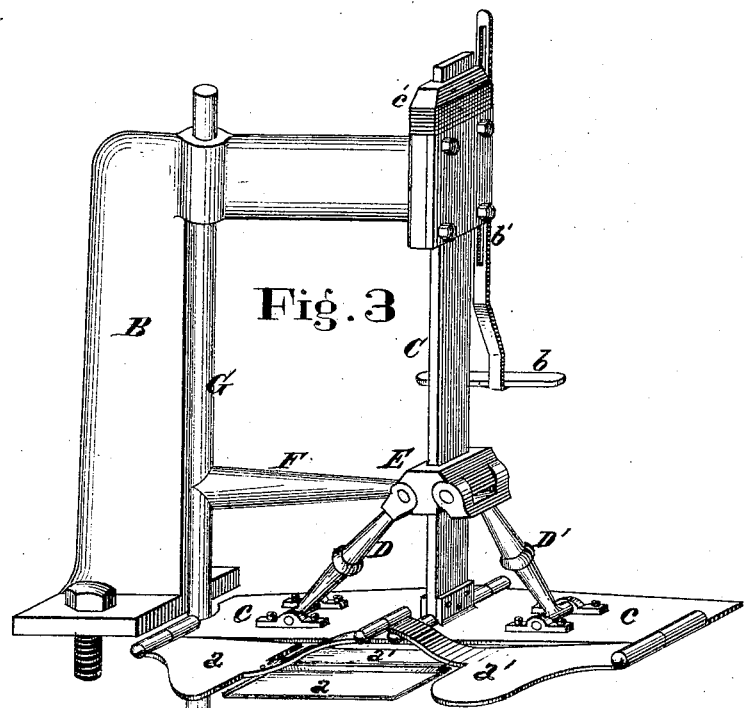
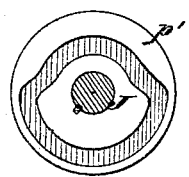
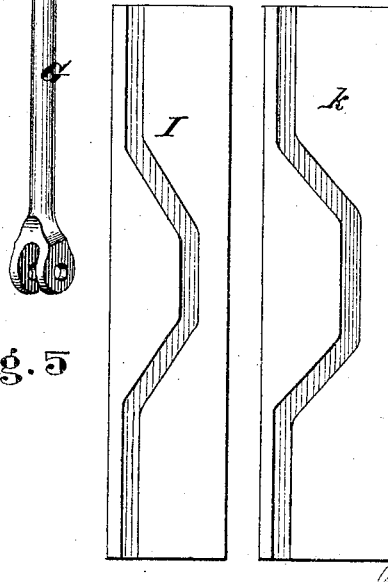

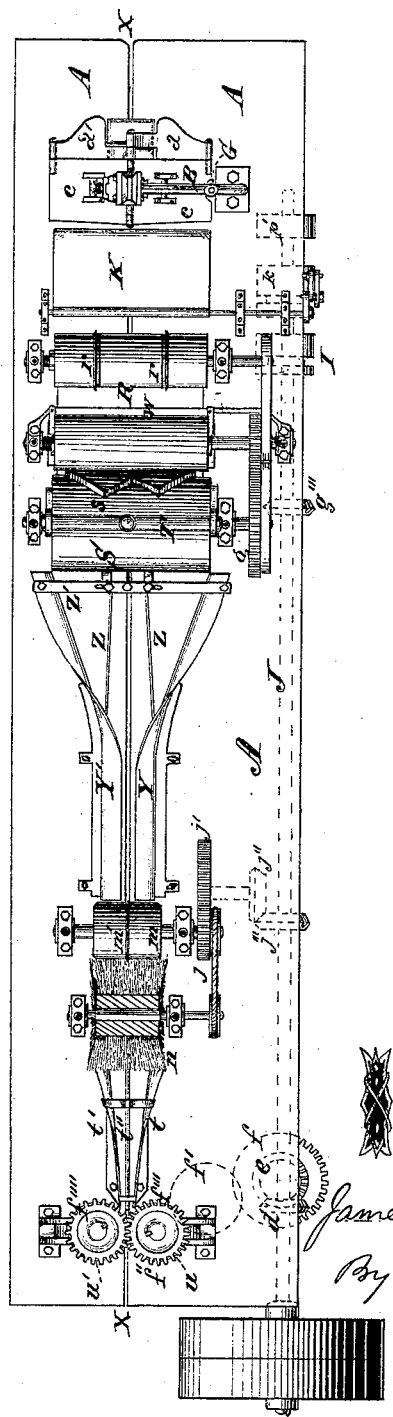

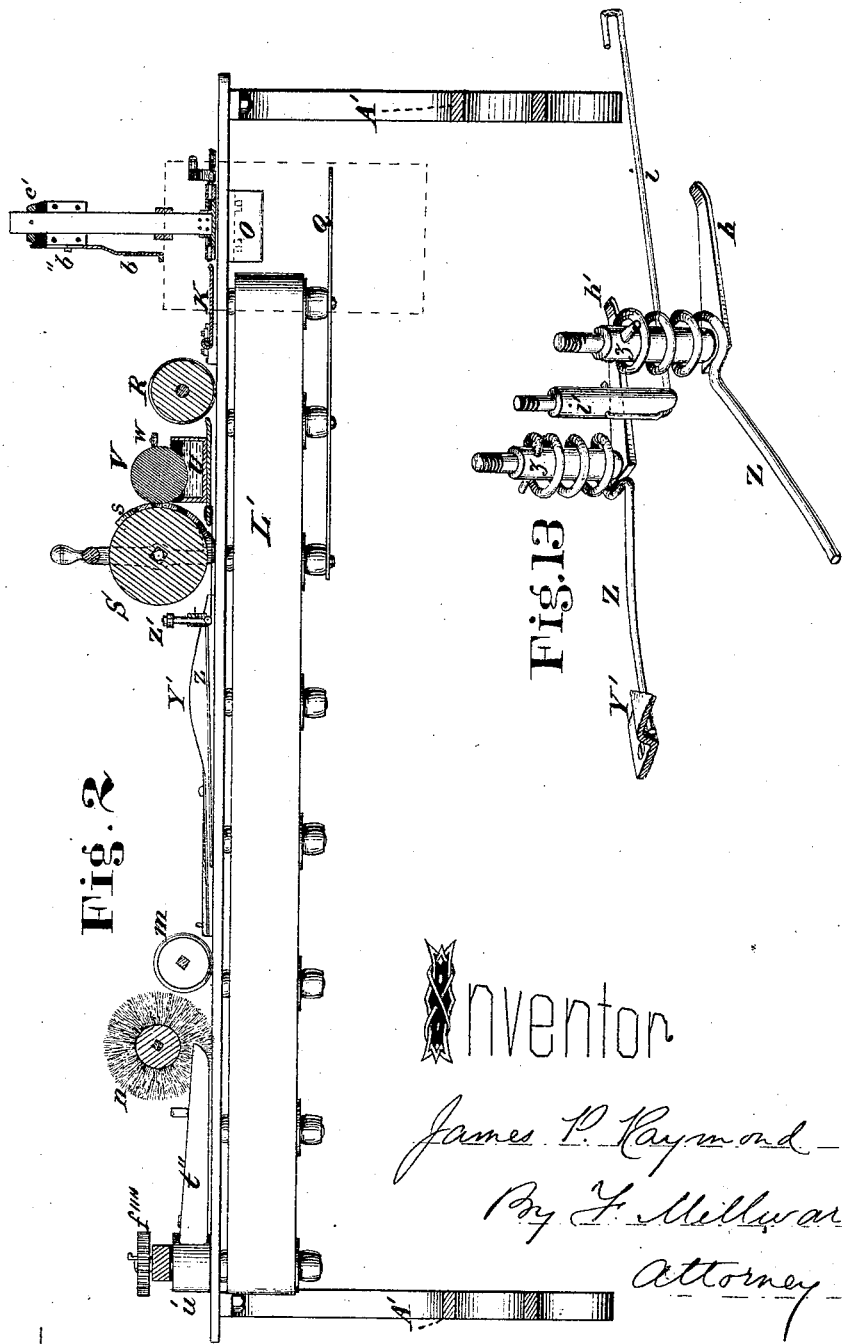

5 Sheets--Sheet 4.

J. P. RAYMOND.
Paper-Bag Machines.

No. 145,125. Patented Dec. 2, 1873.

Inventor
James P. Raymond
By F. Millward

Attest
Edwin Anderson

5 Sheets--Sheet 5.

J. P. RAYMOND.
Paper-Bag Machines.

No. 145,125. Patented Dec. 2, 1873.

Attest.
Phil Hunter
Edwin Anderson.

Inventor.
James P. Raymond
By F. Millward
Attorney.

UNITED STATES PATENT OFFICE.

JAMES P. RAYMOND, OF CINCINNATI, OHIO.

IMPROVEMENT IN PAPER-BAG MACHINES.

Specification forming part of Letters Patent No. 145,125, dated December 2, 1873; application filed May 23, 1873.

*To all whom it may concern:*

Figure 12:
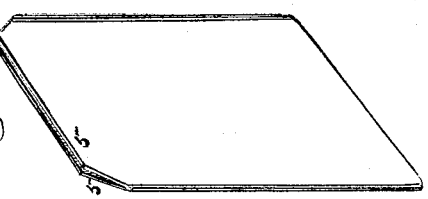
Figure 11:
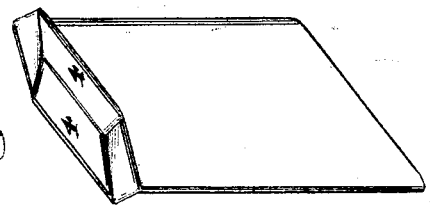
Figure 10:
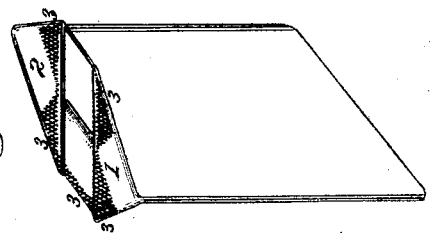

Be it known that I, JAMES P. RAYMOND, of Cincinnati, Hamilton county, State of Ohio, have invented certain new and useful Improvements in Machines for Making Satchel-Bottom Paper Bags, of which the following is a specification:

My invention relates to the class of machines adapted to fold and paste, into the peculiar form known as "satchel-bottom," tubes for paper bags; and my invention consists, first, in a series of successively-operating mechanisms embodied in a complete organized machine, having a slotted or divided table, by which the short tube for each bag is first opened at one end for the formation of a bottom at that end, and spread out into the peculiar form shown in Fig. 10 of the accompanying drawings; then pressed and creased to indicate the finished width of the bottom; then pasted in the peculiar form necessary for satchel-bottoms; then folded or doubled over at the sides to complete the satchel-bottom, as shown in Fig. 11; then creased in a direction lengthwise of the bottom at the center; then doubled back on this central crease into a convenient fold, as shown in Fig. 12, for packing the finished bags, the bag in all these operations after the first being carried along uniformly by continuously-moving feeding-belts; second, in a certain peculiar instrumentality for opening the tube and making the first folds for the bottom of the bag at the first stage of the operation of the machine; third, of certain devices, operating in connection with this opening and folding device, by which the folds are held in place until the bag is fed away; fourth, of a device for enabling the operator to lift at any time the rubber-faced pasting-roller from the table, in the absence of passing bags after accidental stoppage of the feed, that the paste may not be deposited on the table; fifth, in a peculiar combination of side-folders and flexible spring-fingers, by which the unfinished bag shown in Fig. 10 is, after being pasted, folded over into the finished form shown in Fig. 11; sixth, in a peculiarly constructed and operating pressure creasing-roller, by which the bottom folds of the finished bag are firmly pressed, so as to make the paste unite the folds, and a central crease made to facilitate the folding of the bag into the shape shown in Fig. 12; seventh, in a peculiar combination of side-folders, with or without pressure-rolls, by which the bag shown in Fig. 11 is doubled up and pressed into the form shown in Fig. 12, for convenient packing; eighth, in the provision, in combination with the devices before referred to, of feeding-belts, operating to carry the bag through the different stages of operation until it is completed and discharged by said belts. My invention further consists of other specified devices.

Figure 7:
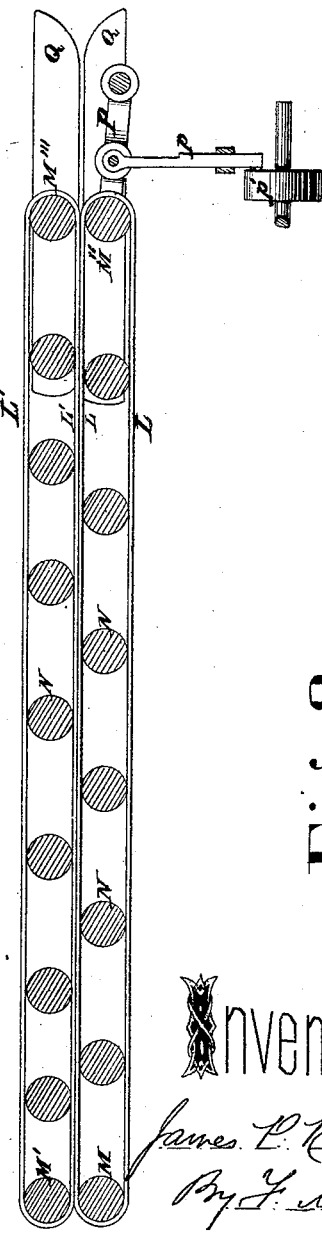
Figure 8:
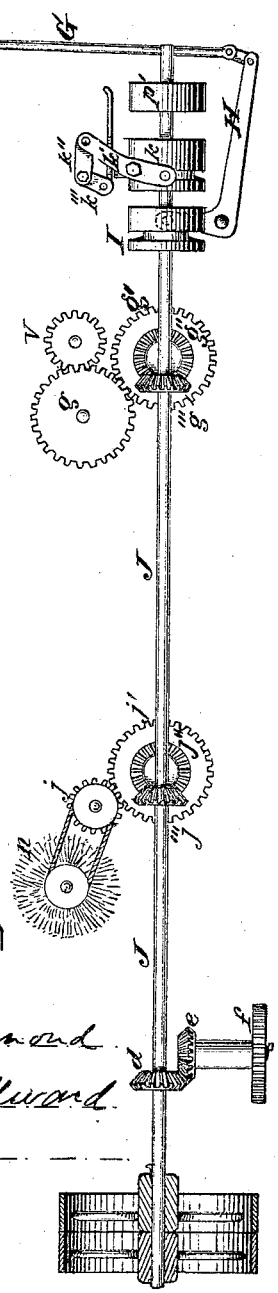
Figure 9:
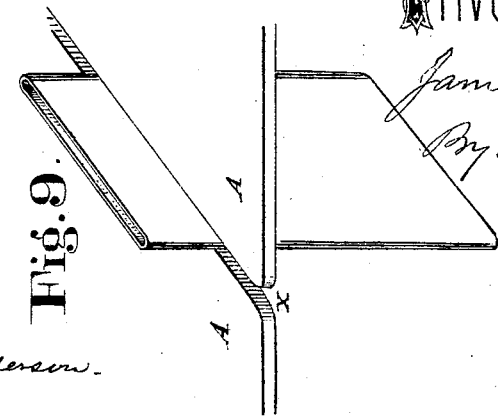

Figure 1 is a plan or top view of a machine embodying my invention. Fig. 2 is a central vertical section of the same. Fig. 3 is an enlarged perspective view of the devices for opening and folding the bottom of the tube of paper at the first stage of the operation of the machine. Fig. 4 is a face view of the cam for giving a reciprocating motion to one of the rollers of the feeding-belts, so that the tube may be allowed to stop at the first stage of the operation of the machine. Fig. 5 is an outstretched view of the face or periphery of the cam for operating the moving parts of the device shown in Fig. 3. Fig. 6 is a similar view of the cam for operating an independent folder at the first stage of the operation of the machine. Fig. 7 is a sectional plan of the feeding-belts and rollers, and the device for moving one of the rollers. Fig. 8 is a view of the driving-shaft of the machine, with its attached gearing and cams for operating the different parts of the machine. Fig. 9 is a perspective view of a short tube, such as is first received into the machine, the figure showing also the end of the slotted table into which the tube is inserted. Fig. 10 is a perspective view of the unfinished bag after the first stage of the operation of the machine. Fig. 11 is a perspective view of the finished bag before it is doubled for packing. Fig. 12 is a perspective view of the bag as it is discharged from the machine in condition for convenient packing and printing.

A is the frame or table of the machine. It is slotted or divided from end to end, as shown at X X, the two parts of the frame being connected together by cross-ties A'. The slotted or divided character of the bed provides for the passage of the bag from end to end of the machine, in such a way that the tube or bag is in an upright position, with a sufficient length of tube above the table for the formation of the bottom, and the remainder of the tube below the table, where it can be griped and fed. A bracket, B, at the end of the machine, supports a gage, $b$, against which the tube to be bottomed is placed at the time the tube is first put into the machine. The opening and folding devices are shown in Fig. 3 in the position they occupy when the opening of the upper end of the tube and folding down of the tube is accomplished; but the position of the tube upon entering the machine (when the folding and opening devices are elevated) is shown in dotted lines in Fig. 2. To the bracket B a sliding bar, C, is fitted to reciprocate vertically, the end of this bar being made to carry the expansion ends $c\ c$. In the motion of the bar C downward the end enters the tube, and, in its continued progress downward, the wings $c\ c$ are expanded, so that at the end of the stroke the wings lie close and flat upon the then flattened folds of the end of the tube, the folds of the tube being, at this stage, as clearly shown in Fig. 10. The position of the bar C and its wings, at this stage, is shown in Fig. 3, Fig. 2, and Fig. 1. The wings $c\ c$ are operated so as to open and close properly by means of the toggle-arms D D' and the block E, the latter being fitted to slide freely on the bar C, and operated by the arm F of the rod G. The bar C derives its motion from the block E, at proper times, through the medium of the arms D D' and wings $c\ c$. The wings $c\ c$ are hinged to the bottom of the bar C, as shown. The bar or rod G is operated by the bell-crank H and revolving cam I on the main driving-shaft J of the machine. The gage $b$, against which the end of the tube is placed, is adjustable by means of slot and screw $b'\ b''$. Two folding-plates, $a\ a'$, hinged together, and to the outer ends of the wings $c\ c$, in the manner shown, serve to hold the fold 1, Fig. 10, in place until it has passed under the wings $c\ c$ in the feeding operation of the machine. The folding-plate K, operated by cam $k$, lever $k'$, link $k''$, and crank-shaft $k'''$, serves to hold the folds 2 and 1 in place, and guide the bag until it is fed past it. L L' are the feeding-belts of the machine, which grasp the tube of paper from the folders $c\ c\ a\ a'$ K at the proper time, and feed it along uniformly through successive operations to complete it. These belts are driven by pulleys M M' M'' M''', over which they pass, and are supported or guided by idlers N. Gearing $d\ e\ f\ f'\ f''\ f'''\ f''''$ connect the driving-pulleys M M' with the driving-shaft J of the machine. It will be seen that when the tube of paper is first fed to the machine it occupies a position partly between the rollers M'' M''', and, as it must necessarily be at rest while under the operation of the folders $c\ c\ a\ a'$ K, the pulley M'' is secured in bearings, which, by means of lever P, pitman $p$, and cam $p'$, are moved laterally, so as to throw the pulleys together in position to feed at the proper time, and, apart to allow the bag to be between them without feeding at another time. O represents one of a pair of thin spring-"clips," between which the tube, Fig. 9, is held snugly while being folded. Thin guide-plates Q may also be used to assist in supporting the tube of paper laterally. R is a pressure-roll, provided with elevated creasing-collars $r$, which are of a width apart equal to the required width of bottom of the finished bag, such as is illustrated in Fig. 11. This roll R not only presses the folds of the bag-bottom close, but indents or creases two lines along the bottom, which facilitates the folding into the finished form of bottom shown in Fig. 11. It is operated by belt-connection with the shaft of paste-applying roller S. This roller is faced with an irregularly-shaped projection, $s$, preferably of india-rubber, which, in revolving, deposits paste upon the passing bottom of the bag, in the manner indicated at 3 by cross-hatched lines in Fig. 10. This roller is operated by gearing $g\ g'\ g''\ g'''$, and is so fitted to the frame of the machine that, by the provision of the cam-ended yoke T, in which the roller is in part journaled, the cam end of the yoke resting on the frame of the machine, as seen in Fig. 2, the roller may be lifted bodily, so as to relieve it from contact with the table of the machine in the accidental absence of passing bags. U is a paste-vat, supported on the frame of the machine, in which a paste-roller, V, revolves, the latter being operated by gearing-connection with the roll S, and works in contact with the facing of rubber or roller S, so that the paste from the vat U may be carried by the roller V and deposited on the rubber projection on roller S, which, in turn, applies to the surface of the bottom of the bag, in the manner indicated in Fig. 10 by cross-hatched lines. W is a scraper, whose inner edge is designed to distribute the paste uniformly over the surface of the roller V, and prevent too great accumulation of paste on the roller V from the vat. Y Y' are stationary side-formers, which, in connection with the spring-fingers Z Z, operate to fold the flaps 4, Fig. 11, into the position shown in that figure, whereby the pasted portions of the bottom are united, and the satchel-bottom completed, with the exception of final pressure.

The spring-fingers, an enlarged view of which is shown detached in Fig. 13, are simply composed of bent wire, the outer ends of which press flexibly against the inner surfaces of the formers Y Y', so as to confine the corners of the fold, and thus insure the folding of the flaps 4 at the lines of the creases made by collars $r$. The inner ends of the wires Z Z are coiled, as shown, to give the necessary strong flexible pressure at the outer ends, and are firmly secured to the posts $z\ z$ of the cross-bar Z'. The bag is guided, as it comes from the roller S, by the flat guiding-plates $h\ h'$, between which and the table it is received. The wire $i$ at the center of the machine, fastened, as it is, at one end to the post $i'$, and at the other end to the bottom of the paste-vat, serves to prevent the folds of the bag being lifted by the paste-applying roller S, and also serves to deliver the bag in proper form to the guides $h\ h'$.

The creasing and pressure roller $m$, operated by gear-wheels $j\ j'\ j''\ j'''$, serves to press the folded and pasted bottom of the bag firmly against the face of the table as the bag is fed along, so that the seams may be firmly united. The creasing-collar $m'$ also scores or presses a central crease in the bottom of the bag, to facilitate the final doubling back for packing. The revolving brush $n$, operated by belt-connection with the roller $m$, serves to wipe off any surplus paste which may pass over the edges of the folds of the bottom, and thus this prevents the sticking of the bottom flaps when folded back into the form of Fig. 12. The two side-formers $t\ t'$ and central plate $t''$ operate as the bag passes in connection with them, each flap 5 passing between one of the side-formers and the central plate, to bend back the bottom of the bag into the form shown in Fig. 12, which is a convenient form for printing, compact packing, and shipment, the revolving rollers $u\ u'$ serving to give the final pressure to insure the retention of the flaps 5 in the position shown in Fig. 12. The collar $c'$, fitted with rubber washer or washers below it, is secured to the bar C at the top, and serves to prevent the bar being forced down too far.

The combination of flexible fingers Z Z and guides or formers Y Y' is not confined to satchel-bottom machines, as it is eminently adapted for tube forming or folding in other bag-machines.

I claim—

1. The machine as a whole, organized by the use of a divided table, to perform, by a series of successive operations, substantially in the manner described, the work of opening and folding down the end of a tube of paper, feeding the tube along the table, pressing the folds, pasting and folding the side flaps, and folding back the flaps for convenience in printing and packing.

2. The reciprocating bar C and hinged opening and folding wings $c\ c$, combined and operating substantially in the manner and for the purpose specified.

3. In combination with the wings $c\ c$ and bar C, the folding-plates $a\ a'$, operating substantially in the manner and for the purpose specified.

4. The combination, with the wings $c\ c$, bar C, and folding-plates $a\ a'$, of the independent folding and guide plate K, substantially as specified.

5. In combination with the roller S $s$, the lifting-yoke T, as and for the purpose specified.

6. The combination of side folders or guides Y Y' and flexible fingers Z Z, operating substantially as and for the purpose described.

7. The pressing and centrally-creasing roller $m\ m'$, operating in the manner and for the purpose specified.

8. The combination of the folders $t\ t'\ t''$, operating substantially as and for the purpose specified.

9. The combination of folders $t\ t'$, central web $t''$, and pressure-rollers $u\ u'$, operating substantially in the manner and for the purpose specified.

10. In a machine for making satchel-bottom paper bags, the vertically-arranged feeding-belts L L', operating substantially as and for the purpose specified.

In testimony of which invention I hereunto set my hand.

JAMES P. RAYMOND.

Witnesses:
  FRANK MILLWARD,
  J. L. WARTMANN.